June 2, 1970 — L. H. WEINAND — 3,515,395
UNIDIRECTIONAL PUMPING SEAL
Filed Sept. 6, 1966 — 2 Sheets-Sheet 1

INVENTOR.
Louis H. Weinand
BY
E. J. Biskup
ATTORNEY

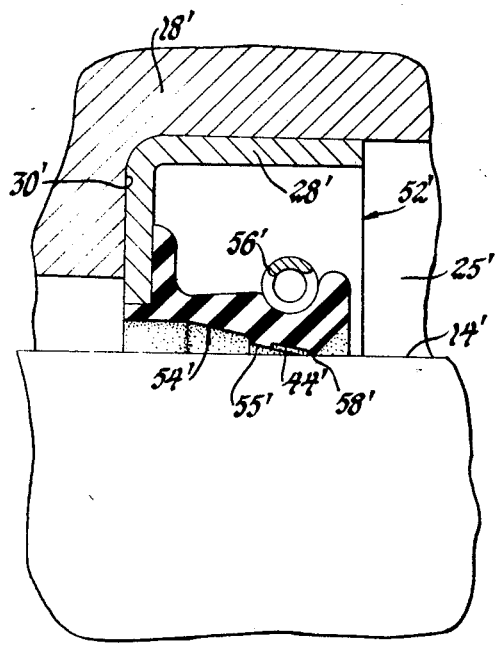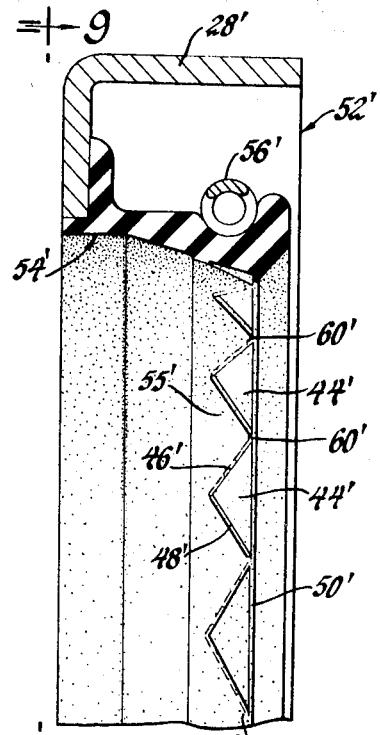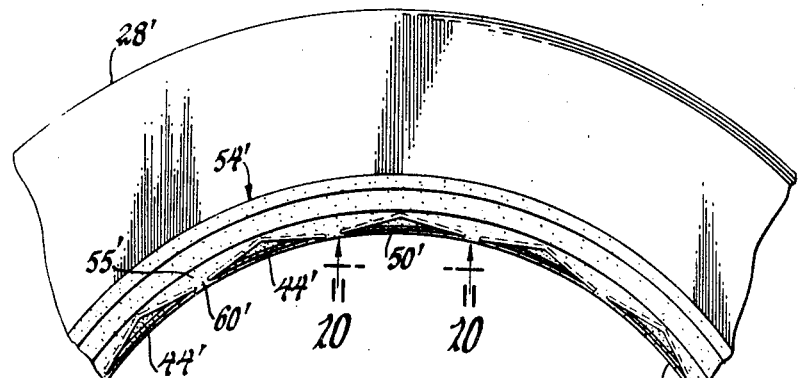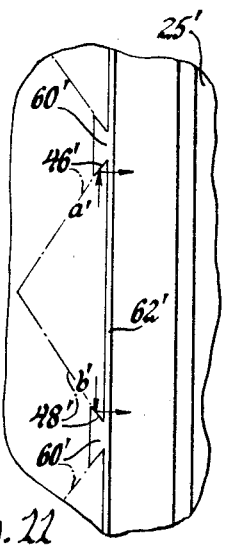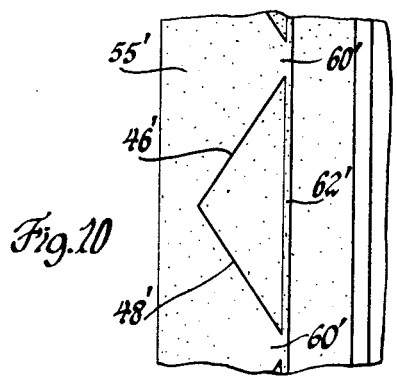

United States Patent Office 3,515,395
Patented June 2, 1970

3,515,395
UNIDIRECTIONAL PUMPING SEAL
Louis H. Weinand, Warren, Mich., assignor to General
Motors Corporation, Detroit, Mich., a corporation of
Delaware
Filed Sept. 6, 1966, Ser. No. 577,236
Int. Cl. F16j 15/32, 15/54
U.S. Cl. 277—134                                    8 Claims

ABSTRACT OF THE DISCLOSURE

A seal incorporates hydrodynamic grooves which are effective to seal a shaft independently of the direction of shaft rotation to thereby prevent the leakage of fluid from a fluid reservoir. The grooves are defined by inclined walled surfaces converging away from the fluid reservoir. The walled surfaces function as miniature hydrodynamic pumps to return the fluid to the fluid reservoir. One walled surface of the groove is effective as a pump for one direction of shaft rotation while the other walled surface is effective as a pump for shaft rotation in the opposite direction.

---

This invention relates to hydrodynamic seals and more particularly to a hydrodynamic seal adapted to seal a shaft irrespective of the direction of shaft rotation relative to the sealing member.

The use of a helical groove or screw thread for generating hydrodynamic forces which serve to seal a rotating shaft is well known in the art. Such means of sealing, however, have been limited to applications in which the shaft rotates in only one direction because the hydrodynamic forces, which effectively maintain a fluid within its reservoir while the shaft is rotating in one direction, will increase leakage by pumping the fluid from its reservoir past the seal member if the direction of shaft rotation is reversed.

The present invention provides a hydrodynamic seal which effectively pumps the fluid in one direction irrespective of the direction of shaft rotation. The sealing arrangement contemplated by this invention includes a shaft rotatable in both clockwise and counter-clockwise directions and a sealing member having a resilient annulus circumferentially surrounding the shaft to contain a fluid located to one side of the sealing member. The sealing member has a sealing surface in contact with the shaft surface. A plurality of generally V-shaped grooves are formed about the circumference of one of the engaged surfaces and these grooves coact with the other surface to establish hydrodynamic forces for containing the fluid within its reservoir. As the shaft rotates, viscous drag imparts a circumferential motion to fluid near the shaft surface. Depending upon the direction of shaft rotation, the fluid entering the groove is directed against one of the opposed angled surfaces of the V-shaped grooves and is displaced therefrom toward the fluid reservoir. If the direction of shaft rotation is reversed, the fluid within the grooves will be directed against the other of the opposed surfaces and will similarly be returned to the fluid reservoir.

One feature of this invention is that it provides a hydrodynamic seal which effectively seals a fluid irrespective of the direction of shaft rotation.

Another feature of this invention is that it provides a hydrodynamic seal having a number of V-shaped grooves formed in one of the engaged surfaces which coact with the other surface to generate hydrodynamic forces for dynamically sealing a fluid.

Yet another feature of the invention is that one of the angled side walls of the V-shaped groove is effective to dynamically seal a fluid by means of hydrodynamic force when the shaft rotates in one direction and the opposed angled side wall is effective for sealing when the shaft rotates in the opposite direction.

Still another feature of the invention is that the seal includes means for sealing a fluid while the members are stationary.

The features of the invention will be made apparent in the following detailed description taken in conjunction with the accompanying drawings wherein:

FIG. 7 is a sectional view of another embodiment of the present invention;

FIG. 8 is a sectional view of the seal shown in FIG. 7;

FIG. 9 is a view taken generally in a plane indicated by line 9—9 of FIG. 8;

FIG. 10 is a view taken generally in a plane indicated by line 10—10 in FIG. 9; and FIG. 11 is a view showing the sealing engagement between the shaft and the seal for the seal installation shown in FIG. 7.

Figure 1:
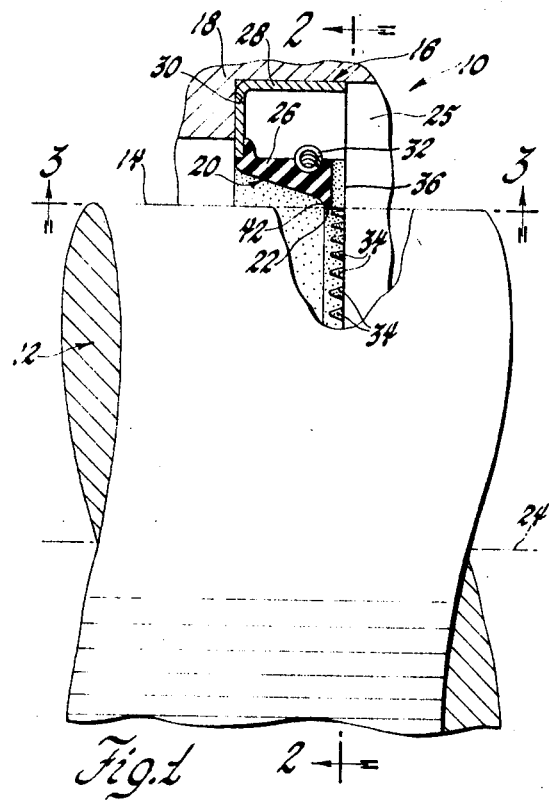
FIG. 1 is a view, partially broken away and in section, of a seal installation embodying seal means according to the present invention.
Figure 2:
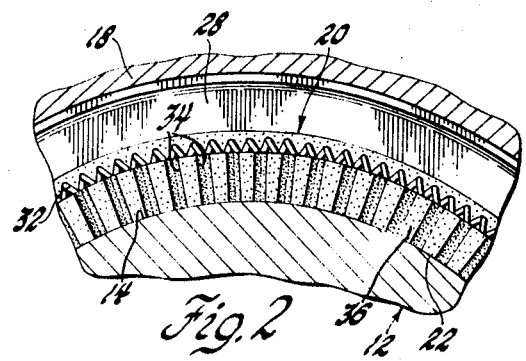
FIG. 2 is a view taken generally in a plane indicated by the line 2—2 of FIG. 1.

Referring to FIG. 1, a seal installation 10 includes a shaft 12 having an outer cylindrical surface 14 to be sealed and a seal 16 mounted within a housing 18. The seal 16 comprises an elastomeric sealing member 20 having an annular sealing surface 22 in sealing engagement with surface 14. The shaft 12 and the seal 16 are rotatable relative to each other about their common axis 24 while the fluid being sealed is located to one side 25 of the seal 16 between the shaft 12 and the housing 18.

The elastomeric sealing member 20 includes a flex section 26 bonded at one end thereof to an annular metallic casing 28 located within a shouldered bore 30 in housing 18. A spring member 32 encircles the sealing member 20 and applies a predetermined radial load for urging the surface 22 of sealing member 20 into sealing engagement with surface 14. Spring member 32 may be a garter spring as shown in FIG. 1 or any other suitable type spring.

A number of equally spaced, generally V-shaped grooves 34 are cut or otherwise formed in the radially extending face 36 of sealing member 20. Grooves 34 extend through the sealing member 20 and form a V-grooved pattern in sealing surface 22. Each of the grooves so formed has opposed angled side walls 38 and 40 which are adapted to generate hydrodynamic forces for containing the fluid within its reservoir identified by the numeral 25 while the shaft 12 is in motion. The included angle between side walls 38 and 40 as well as the number of grooves utilized will vary according to the sealing requirements of the specific seal installation. In the embodiment shown in FIG. 3 the included angle (A) is 90°. The grooved portion of the sealing surface 22 is backed by a circumferentially extending static sealing lip 42 which interferingly engages the surface 14 to seal the fluid while the shaft is at rest.

Figure 4:
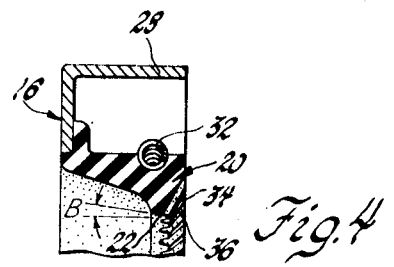
FIG. 4 is a sectional view of a modified sealing member.

It will be noted that the radially extending face 36 and the grooves 34 as shown in the preferred form of FIG. 1 extend generally perpendicularly to the shaft surface 14. As seen in the modified form of FIG. 4, however, face 36 and grooves 34 therein may be angled to the surface 14. It should also be noted that the sealing surface 22 of both the modified and preferred forms is angled slightly radially outward beginning at the face 36 when not engaged with the shaft as illustrated by angle (B) shown in FIG. 4. This ensures that the V-grooved portion of the sealing surface 22 will engage surface 14 when the seal 16 is interferingly mounted on shaft 12.

Figure 3:
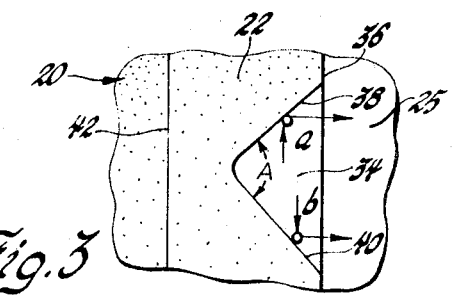
FIG. 3 is an enlarged view taken generally in a plane indicated by the line 3—3 of FIG. 1.

An understanding of the operation of the unidirectional pumping seal may best be gained by referring to FIGS. 1 and 3. The fluid reservoir is to the right of seal 16 in FIG. 1 and clockwise rotation of shaft 12 will be assumed when viewed from the right. As shaft 12 rotates, viscous shear forces set the fluid in motion circumferentially about the shaft surface 14. For descriptive purposes a fluid particle a is shown in FIG. 3 to illustrate the pumping action or fluid flow under the described conditions. Fluid moving toward side wall 38 impinges thereagainst and is directed along the angled surface to be displaced from left to right as indicated by the arrows in FIG. 3. Thus, the fluid is displaced toward the fluid reservoir 25 and away from the seal. If the direction of rotation of the shaft is reversed, a similar fluid displacement is achieved. In other words, with the shaft moving counterclockwise the fluid is directed against side wall 40 as indicated by the arrows and particle b in FIG. 3 and is again displaced from left to right away from the seal to balance the energy potential tending to cause the fluid to flow past the seal. The above is a simplification of the actual fluid flow process involved, but serves to demonstrate that the fluid flow induced by the pumping action of the V-groove surfaces is unidirectional irrespective of the direction of shaft rotation. It is to be understood that only one side wall of the V-groove is effective as a pumping member when the shaft rotates in one direction. Thus, if surfaces 38 are the effective pumping members, surfaces 40 are ineffective and have no tendency to pump fluid past the seal. The same is true of surfaces 38 if the rotation of the shaft is reversed and surfaces 40 become the pumping members.

Figure 5:
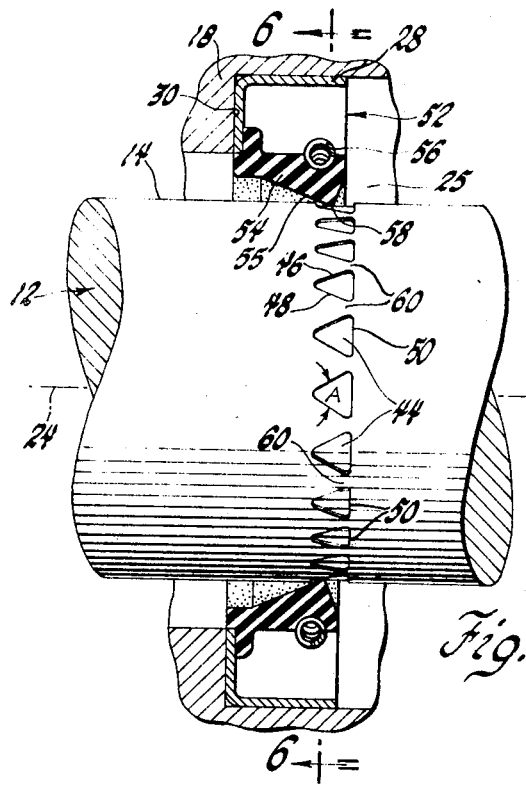
FIG. 5 is a view similar to FIG. 1 of another embodiment of the present invention.
Figure 6:
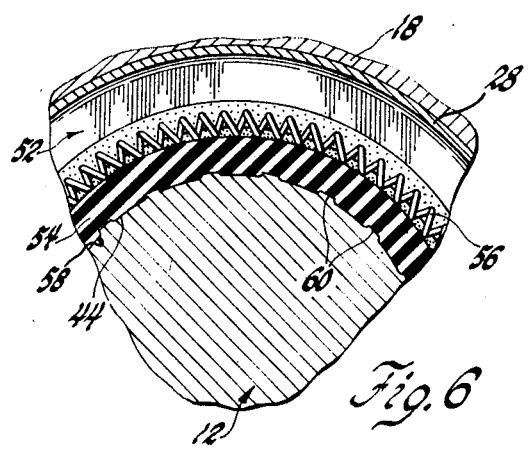
FIG. 6 is a sectional view taken generally in a plane indicated by the line 6—6 of FIG. 5.

Another embodiment of the invention is illustrated in FIG. 5 and it will be noted that those parts corresponding to the parts in the embodiment of FIG. 1 are identified by the same numerals. According to this embodiment, a plurality of circumferentially aligned V-shaped grooves 44 are formed in surface 14 of shaft 12. Each groove 44 is formed as a triangularly-shaped recess in surface 14 and each has angled side walls 46 and 48, with an included angle (A). Grooves 44 are preferably equally spaced about surface 14 and arranged with their walls 50 in a plane normal to axis 24. The number of grooves and the included angle beween surfaces 46 and 48 may be varied depending upon the sealing conditions. The recesses in the shaft surface are preferably shallow and will normally be less than .002 inch deep.

The seal installation further includes a conventional lip seal 52 having an elastomeric sealing member 54 including inclined inner surface 55 encircled by spring member 56 to urge a seal lip 58 into sealing engagement with surface 14. The seal lip 58 engages each groove 44 at a point intermediate the length of side walls 46 and 48. With shaft 12 at rest, resilient member 54 of seal 52 is interferingly engaged with surface 14. Due to the flexibility of member 54, the seal lip 58 is able to assume a deformed shape and conform to the irregular shaft surface comprised of lands 60 and grooves 44. This creates a static seal for preventing fluid from leaking beneath the seal while the shaft is at rest. With the shaft rotating, seal lip 58 rides on lands 60 free of the grooves.

As shaft 12 rotates, seal lip 58 cooperates with grooves 44 to dynamically seal a fluid located to the right of seal 52 in FIG. 5 in the same manner as previously described in the first embodiment. As the shaft rotates clockwise as viewed from the right in FIG. 5, surface 46 acts as a miniature hydrodynamic pump to displace the fluid from left to right toward the fluid reservoir. If shaft rotation is reversed, surface 48 pumps the fluid back to the reservoir. Whe nthe shaft stops, seal lip 58 again blocks the grooves to seal the shaft surface.

In a further modification shown in FIGS. 7 through 11, a plurality of V-shaped grooves 44′, similar to the grooves 44 of FIG. 5, are formed in the frustoconical surface 55′ of the lip seal 52′. Referring to FIG. 7, the surface 55′ is on the air side of the lip seal 52′ and is spaced from the fluid reservoir 25′ by a seal lip 58′. As seen in FIG. 10, the grooves 44′ are generally triangular in shape and are defined by a base wall 50′ and inclined walls 46′ and 48′ which converge away from the seal lip 58′ and the fluid reservoir 25′.

The grooves 44′ are evenly spaced about the circumference of the surface 55′ and are separated by lands 60′. As shown in FIGS. 7 and 11, the grooves 44′ have their bases at the seal edge in engagement with the smooth cylindrical surface 14′ of the shaft 12′. The grooves 44′ have a depth of approximately 0.002 to 0.004 inch in the preferred arrangement to form recesses in the seal lip 58′ which in this embodiment has a width sufficient to accommodate the grooves 44′ and to form a static sealing surface 62′ intermediate the grooved surface 55′ and fluid reservoir 25′.

This embodiment functions in substantially the same manner as described with reference to the FIG. 3 embodiment. As seen in FIG. 11, the fluid reservoir 25′ is to the right of the static sealing surface 62′. As the shaft rotates in one direction, a fluid particle a′ impinges against the inclined wall 48′ and is pumped from left to right past the sealing surface 62′ to the fluid reservoir 25′. For the opposite direction of the shaft rotation, a fluid particle b′ impinges against the inclined wall 46′ and is pumped from left to right past the sealing surface 62 to the fluid reservoir 25′.

This sealing arrangement has provide to be very effective due largely to the fact that it has been found that such grooves when recessed but a few thousandths of an inch into the sealing surface, have a comparatively high pumping rate and sealing potential. The arrangement also is considered advantageous because the grooves pump back the oil after it has leaked past the static seal lip. The seal lip is therefore assured of continuous lubrication with accompanying greater useful life due to a slow wear rate.

Various changes and modifications may be made to the above-described embodiment without departing from the spirit of the invention. Such changes and modifications are contemplated by the inventor who does not wish to be limited except by the scope of the appended claims.

I claim:

1. A hydrodynamic seal, comprising: an annular casing; an annular sealing member formed of an elastomeric material attached to said casing, said sealing member having converging frustoconical surfaces intersecting at an annular seal edge; a plurality of recesses formed in one of the surfaces, each of said recesses being defined by a pair of walled surfaces converging away from said seal edge, each of said walled surfaces having a base adjacent said seal edge, said recesses being mutually separated by lands and having a depth in the order of 0.002 to 0.004 inch.

2. A hydrodynamic seal for statically and dynamically sealing a bidirectionally rotatable shaft, comprising: an annular casing; an elastomeric sealing member attached to said casing, said sealing member having converging frustoconical surfaces intersecting at a radially inwardly facing seal edge; a plurality of evenly spaced grooves formed in one of said surfaces, said grooves having a depth of approximately 0.002 to 0.004 inch and being defined by pairs of inclined walls converging away from said seal edge and a base wall interconnecting said inclined walls adjacent said seal edge; lands mutually separating said grooves, said seal edge and said lands being engageable with the shaft to form a static sealing surface therebetween, said inclined walls being alternately operative to oppose fluid leakage past said seal edge upon reversal of shaft rotation.

3. A hydrodynamic seal for sealing the space between rotatable members irrespective of the direction of relative rotation and preventing the flow therepast of fluid from a reservoir, comprising: an elastomeric sealing annulus mounted on one of the members and having converging frustoconical surfaces defining a contact surface which is engageable with an annular surface on the other of said members; pairs of oppositely angled walled surfaces formed on the frustoconical surface spaced from said reservoir by said contact surface, said walled surfaces converging away from said reservoir and having base portions engageable with said annular surface adjacent said contact surface, one of said walled surfaces being effective to generate hydrodynamic forces for pumping fluid leaking past said contact surface to the reservoir when the members are relatively rotating in one direction, the other of said walled surfaces being effective to generate hydrodynamic forces for pumping fluid leaking past said contact surface to the reservoir when the members are relatively rotating in the other direction.

4. A hydrodynamic seal for preventing the leakage of fluid from a fluid reservoir under static and dynamic operating conditions between bidirectionally relatively rotatable members, said seal comprising: an elastomeric sealing member mounted on one of the members having converging frustoconical surfaces defining a contact surface which is engageable with an annular surface on the other of said members; a plurality of circumferentially spaced recessed regions on the frustoconical surface spaced from the fluid reservoir by said contact surface that are defined by pairs of walled surfaces converging away from the fluid reservoir and having base portions engageable with said annular surface adjacent said contact surface, one of said walled surfaces being effective to generate hydrodynamic forces for pumping fluid leaking into said regions past said contact surface to the reservoir when the members are relatively rotating in one direction, the other of said walled surfaces being effective to generate hydrodynamic forces for pumping fluid leaking into said regions past said contact surface to the reservoir when the members are relatively rotating in the other direction.

5. A hydrodynamic seal for preventing the leakage of fluid from a fluid reservoir under static and dynamic operating conditions between bidirectionally rotating members, said seal comprising: an elastomeric member mounted on one of the members and having converging frustoconical surfaces intersecting at a continuous circumferential static seal edge which is engageable with the other of said members; a circumferentially spaced series of grooves formed in the frustoconical surface spaced from said fluid reservoir by said seal edge which are mutually separated by lands, each of said grooves being defined by pairs of inclined walls converging away from said seal edge and a base wall interconnecting said inclined walls adjacent said seal edge, said seal edge and said lands being engageable with said other member to form a static sealing surface therebetween and said inclined walls being alternately operative to oppose fluid leakage past said seal edge upon reversal of shaft rotation.

6. A unidirectional pumping seal for sealing a bidirectionally rotatable shaft, comprising: an annular casing; an elastomeric sealing member attached to the casing, said sealing member having converging frustoconical surfaces intersecting at a continuous circumferential static seal edge which is engageable with the shaft; a circumferentially spaced series of grooves formed in one of said frustoconical surfaces, said grooves having an operative depth of less than .004 inch adjacent said seal edge and being defined by pairs of inclined walls converging away from said seal edge and a base wall interconnecting said inclined walls adjacent said seal edge; and lands mutually separating said grooves, said seal edge and said lands being engageable with the shaft to form a static sealing surface therebetween, said inclined walls being alternately operative to oppose fluid leakage past said seal edge upon reversal of shaft rotation.

7. The invention as recited in claim 6 wherein said grooves are generally V-shaped and said inclined walls are substantially straight and intersect on said one of said frustoconical surfaces at an apex remote from said seal edge.

8. The invention as recited in claim 6 wherein spring means retained on said sealing member serves to radially inwardly bias said seal edge.

References Cited

UNITED STATES PATENTS

| 1,811,588 | 6/1931 | Moreau | 277—134 |
| 3,059,938 | 10/1962 | Hennessy | 277—134 X |
| 2,188,857 | 1/1940 | Chievitz | 277—134 X |
| 2,446,380 | 8/1948 | Meyers et al. | 277—134 X |
| 2,958,551 | 11/1960 | Rogers | 277—134 X |
| 3,259,393 | 7/1966 | Dega | 277—134 |

FOREIGN PATENTS

| 499,480 | 1/1939 | Great Britain. |
| 673,726 | 6/1952 | Great Britain. |
| 888,198 | 1/1962 | Great Britain. |
| 1,342,278 | 9/1963 | France. |

SAMUEL ROTHBERG, Primary Examiner

UNITED STATES PATENT OFFICE
CERTIFICATE OF CORRECTION

Patent No. 3,515,395        Dated June 2, 1970

Inventor(s) Louis H. Weinand

It is certified that error appears in the above-identified patent and that said Letters Patent are hereby corrected as shown below:

Column 3, line 49, "their walls 50 in a plane" should read -- their base walls 50 in a plane --. Column 4, line 2, "Whe nthe" should read -- When the --.

Signed and sealed this 3rd day of November 1970.

(SEAL)
Attest:

EDWARD M. FLETCHER, JR.
Attesting Officer

WILLIAM E. SCHUYLER, JR.
Commissioner of Patents